Oct. 11, 1927.
W. T. HUNT
1,645,192
TRANSMISSION LOCK MECHANISM
Filed Feb. 21, 1921
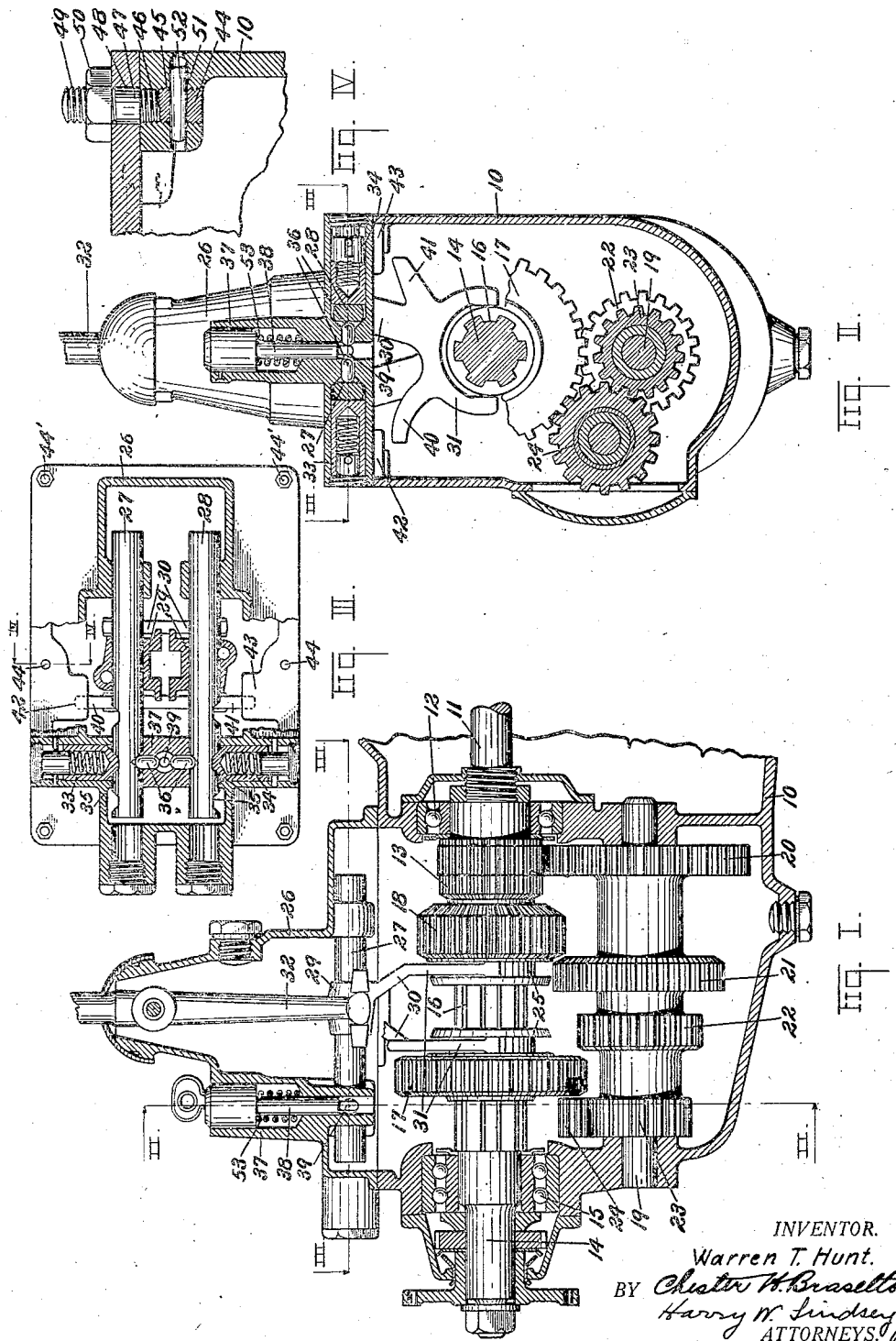
INVENTOR.
Warren T. Hunt.
BY Chester W. Braselton
Harry W. Lindsey Jr.
ATTORNEYS.

Patented Oct. 11, 1927.

1,645,192

UNITED STATES PATENT OFFICE.

WARREN T. HUNT, OF TOLEDO, OHIO, ASSIGNOR TO THE WILLYS-OVERLAND COMPANY, OF TOLEDO, OHIO, A CORPORATION OF OHIO.

TRANSMISSION-LOCK MECHANISM.

Application filed February 21, 1921. Serial No. 446,890.

This invention relates to a transmission lock mechanism for automobiles and more especially to a mechanism adapted to lock the movable gears against movement when desired and to prevent the cover of the transmission case from being removed so that the automobile may not be used by unauthorized persons.

One object of the invention is to provide a device of this character for locking the controlling mechanism in such a manner in order to prevent removal of the shifters for the movable gears.

A further object of the invention is to provide a device of this character which when the controlling mechanism is locked in position, the cover on the transmission casing will also be held secure from removal.

A further object of the invention is to provide a device of this character in which the shifters are of such construction that their removal will be prevented by the cover of the transmission casing when the shifters are locked in neutral position.

Another object of the invention is to provide a specific form of means for fastening the cover on the transmission casing in order to make it impossible for an unauthorized person to remove or shift the cover and to expose the shifters in an accessible manner.

A further object of the invention is to provide a device of the character described, which is of simple construction and efficient in operation.

Other objects of the invention relate to economies of manufacture and details of construction, which will hereinafter appear from the detailed description to follow.

The objects of the invention are accomplished in one instance by the devices and means described in the following specification, but it is evident that the same may be varied widely without departing from the scope of the invention as pointed out in the appended claims.

A structure showing one embodiment of the invention which may be preferred, is illustrated in the accompanying drawing forming a part hereof in which:

Figure I is a vertical longitudinal section of a transmission casing of an automobile, showing the relative positions of the operating mechanism with respect to the transmission shaft.

Figure II is a vertical cross section of the transmission casing along the line II—II of Figure I, showing the improved means for preventing the removal of the cover.

Figure III is a horizontal longitudinal section through the cover of the transmission casing taken along the lines III—III of Figures I and II.

Figure IV is a sectional view in detail of the improved fastening means for the cover of the transmission cases taken along the line IV—IV of Figure III.

An undesirable feature of transmission locks is that a lock of this character is placed in a removable cover plate of the transmission casing. The lock co-operates with suitable mechanism to lock two or more parallel rods slidably mounted in the cover. The rods are provided with suitable yokes for engaging axially movable gears. A control lever operates the slidable rods. As will be seen, it would be an easy matter for anyone familiar with such constructions to remove the top cover together with the lock, shifters, control lever and the yoke from the transmission casing and then replace the same by an unlocked construction or by some other means for shifting the gears. The present mechanism with its appurtenant parts for operating the gears, provide other means for preventing the removal of the cover as will be more fully described.

Referring to the drawing, 10 indicates the transmission casing of the conventional type having a driving element or power shaft 11 extending within the casing, and rotatably mounted in a bearing 12 positioned in one end thereof. The driving element or power shaft is adapted to be operatively connected with an engine (not shown), and carries a driving pinion 13 properly secured thereto within the casing. A driving shaft 14 is rotatably mounted in an anti-friction bearing 15 carried by the casing, and is so positioned as to be in axial alignment with the power shaft 11. The end of the drive shaft 14 which extends within the transmission casing is provided with a plurality of splines 16 so arranged as to permit movement of the movable gears 17 and 18 carried by the drive shaft in a direction longitudinally of the shaft, and at the same time prevent rotation of these gears with respect to the shaft. A counter-shaft 19 is also mounted in bearings carried by the casing, and is positioned substantially parallel to the longitudinal axis of the drive shaft 14. A plurality of gears 20, 21, 22 and 23 are firmly secured to the countershaft rotated therewith. The gear 20 is continually in mesh with and constantly driven by the pinion 13 secured to the end of the power shaft. The gears 21, 22 and 23 are thus constantly rotated from the driving pinion 13. A gear 24 is carried by a fixed shaft (not shown) and is constantly in mesh with and continually rotated by the gear 23 carried by the countershaft.

The movable gears 17 and 18 are provided with shifting collars 25 for engagement by the shifting arms, whereby the said gears may be moved in a direction longitudinally of the drive shaft. The pinion 13 is adapted to be constantly rotated by the movement of the power shaft 11 thus communicating rotative movement to the gear 20 and the countershaft 19 together with the gears 21, 22 and 23 carried by the countershaft, and the gear 24 which is constantly in mesh with gear 23. Gears 17 and 18 are shown in Figure I as occupying their neutral positions in which they are out of mesh with the gears carried by the countershaft, and so positioned that the power shaft rotates freely without communicating rotative movement of the drive shaft. When the movable gear 18 is moved forwardly into close engagement with the pinion 13, clutch mechanism (not shown) is provided for securing driving engagement between the adjacent faces of the gear 18 and the pinion 13 whereby the drive shaft is directly operated from the power shaft. If, however, the movable gear 18 is moved rearwardly a sufficient distance, it will be placed in mesh with the gear 21 carried by the counter shaft whereby rotative movement may be imparted to the drive shaft from the power shaft through the countershaft 19 and in the same direction as by engagement of the gear 18 with the driving pinion 13 but at a lower speed. If the movable gear 17 is moved in a forwardly direction, it is placed in mesh with the gear 22 carried by the countershaft, whereby rotative movement is imparted to the drive shaft through the countershaft, in the same direction as the rotative movement imparted to the shaft by means of the gear 18 but at a lower rate of speed, as will be evident from comparing the relative size of the gears 17 and 22. If, however, the movable gear 17 is moved in the opposite direction, toward the rear, it will be placed in mesh with the gear 24 whereby rotative movement will be imparted to the drive shaft in a direction opposite to that in which it would be rotated under the several conditions previously described.

In order to provide mechanism for properly controlling movement of the movable gears, a pair of rods 27 and 28 are slidably mounted in the base portion of a supplemental casing 26. Firmly secured to each of these rods is a split collar 29 provided with a downwardly extending arm 30. Each arm 30 has a forked end or yoke 31 adapted to partially embrace one of the shifting collars 25.

A control lever 32 pivoted in the supplemental casing 26 is adapted to operate the split collars 29. Spring-pressed slidable detents 33 and 34 engage notches 35 cut in the slidable rods 27 and 28 and are adapted to position the rods and aid the operator in determining the position of the movable gear to produce the variable speeds. The middle notches when engaged by the slidable detents 33 and 34 determine the neutral position of the control lever.

Locking detents 36 slidably mounted in a lock casing 37 which projects downwardly between the slidable members 27 and 28 are in alignment with the slidable detents 33 and 34 and engage notches on the inner rounded portions of the members 27 and 28. A spring-pressed plunger 38 mounted in the lock casing 37 and adapted to be locked in depressed position by a key has a reduced portion 39 projecting between the detents 36 and forcing them into locking engagement with the shifters 27 and 28 whereby the shifters and their appurtenant parts are held securely in neutral position. The control lever 32 is likewise locked in neutral position.

From one of the arms 30 a lug or projection 40 extends laterally upward while from the other side of the yoke 31, likewise extending laterally upward and outward and opposite the lug 40 is a lug 41. These lugs are preferably though not necessarily made integral with the arm 30 and yoke 31 and are designed to be placed in position beneath and slightly spaced from inwardly extending plates or projections 42 and 43 respectively formed on the transmission casing 10 when the movable gears 17 and 18 are placed in neutral position by the control lever 32 and the shifters 27 and 28 are in position to be locked against further movement by depressing the plunger 38 and forcing the reduced portion 39 of the plunger between the adjacent ends of the detents 36 locking them in engagement with the grooves of the shifters 27 and 28.

The supplemental casing or cover 26 is secured to the transmission casing 10 by means of studs 44 and bolts 44'. As shown in detail in Figure IV of the drawing the inner flanges 42 and 43 are perforated at 45 and the perforations are internally threaded to receive the threaded portions 46 of the studs, a portion 47 of the studs being adapted to be gripped by a suitable tool for turning the studs. The cover 26 is perforated at 48 to receive the outwardly projecting portions 47 of the studs. A portion 49 of the stud is threaded to receive nuts 50 for fastening the cover in place.

A made perforation 51 is tapped through the casing 10, flanges 42 or 43 and stud 44. After a tapered pin 52 is driven home, the opening in the casing is peened to prevent the removal of the pin.

From the above description it will be noted that the cover of the casing can never be removed when the shifters 27 and 28 have positioned the gears 17 and 18 in neutral. When the shifters are in this position they are locked from further movement by depressing the enlarged head of the locking plunger 38 until a spring-pressed keeper in the enlarged head slips into an appropriate opening in the casing of the lock and the reduced portion 39 of the plunger forces the detents 36 into notches in the shifters.

The lugs or projections 40 and 41 of the arms 30 are located directly below the flanges 42 and 43 respectively of the casing 10. If the bolts 44' only were employed it would be possible after removing them to shift or turn the cover sufficiently to slide the lugs 40 and 41 from beneath the flanges 42 and 43 respectively, but by the use of the studs 44 which can not be removed, the cover 26 cannot be shifted. Furthermore, the studs 44 are held secure from removal by the pins 52 which being tapered and driven home can not be removed by inserting a bent instrument between the cover 26 and the casing 10, when the cover is raised slightly before the lugs 40 and 41 engage the flanges 42 and 43. The peening of the tapered perforation 51 further places obstacles in the way of any unauthorized person who attempts to remove the cover 26.

In removing the cover a key is employed to force the spring-pressed keeper of the lock out of registry with the appropriate opening in the lock casing when the spring 53 raises the plunger 38 out of engagement with the detents 36 and the control rod 32 may be operated to shift the gears and remove the lugs 40 and 41 from beneath the flanges 42 and 43.

The bolts 44' and the nuts 50 are removed and the cover may then be released from the casing 10.

As a further precaution to prevent the studs 44 from being readily cut off, they may be made of case hardened steel or some other hard metal that would resist cutting or sawing by any instrument adapted for such a purpose.

While I have shown and described in detail the embodiment of the invention, it is to be understood that this showing and description is illustrative only for the purpose of rendering my invention more clear, and that I do not regard the same as limited to the details of construction illustrated or described, nor any of them, except in so far as I have included such limitations within the terms of the following claims in which it is my intention to claim all novelty inherent in the invention broadly as well as specifically.

Having thus described my invention, what I claim and desire to secure by Letters Patent is:

1. The combination of a variable power transmitting mechanism, a casing enclosing the same, a removable cover for said casing, mechanism carried by said cover for shifting the movable members of said variable power transmitting mechanism, means for locking said shifting mechanism against operative movement and means on said shifting mechanism for preventing the removal of said cover.

2. The combination of a variable power transmitting mechanism, a casing enclosing the same, a removable cover for said casing, mechanism carried by said cover for shifting the movable members of said variable power transmitting mechanism, means for locking said shifting mechanism against operative movement, one member for shifting said mechanism being adapted to prevent the removal of the cover when the said shifting mechanism is in locked position.

3. The combination of a variable power transmitting mechanism, a casing enclosing the same, a removable cover for said casing, a pair of shifters carried by said cover for shifting the movable members of said variable power transmitting mechanism, means for locking said shifters in fixed position and means on one of said shifters for preventing the removal of the said cover.

4. The combination of a variable power transmitting mechanism, a casing enclosing the same, a removable cover for said casing, mechanism for shifting the movable members of said variable power transmitting mechanism, means for locking said shifting mechanism against operative movement and means on said casing co-operating with said shifting mechanism to prevent the direct removal of said cover and fastening means for said cover comprising members permanently fixed to said casing and projecting through said cover to prevent turning of said cover.

5. The combination of a variable power transmitting mechanism, a casing enclosing the same, a removable cover for said casing, a mechanism carried by said cover for shifting the movable members of said variable power transmitting mechanism, means for locking said shifting mechanism against operative movement, means for locking said cover to prevent direct removal thereof, and other means co-operating with said cover to prevent turning of the said cover.

6. The combination of a variable power transmitting mechanism, a casing enclosing the same, a movable cover for said casing, mechanism for shifting the movable members of said variable power transmitting mechanism, means for locking said cover against direct withdrawal from said casing, and means permanently fixed to said casing and projecting through said cover for preventing turning of said cover.

7. The combination of a variable power transmitting mechanism, a casing enclosing the same, a removable cover for said casing, and a pair of shifters for shifting the movable members of said variable power transmitting mechanism, a lug on one of said shifters, and a lug on the casing adapted to co-operate with the lug on the shifter to prevent removal of the cover.

8. The combination of a variable power transmitting mechanism, a casing enclosing the same, a removable cover for said casing, a pair of shifter forks for shifting the movable members of said variable power transmitting mechanism, and projections on one of said shifter forks to prevent the removal of the cover.

9. The combination of a variable power transmitting mechanism, a casing enclosing the same, a removable cover for said casing, mechanism for shifting the movable members of said variable power transmitting mechanism, fastening means for said cover to prevent direct withdrawal thereof and independent means on the casing to prevent turning of said cover.

10. The combination of a variable power transmitting mechanism, a casing inclosing the same, a removable cover for said casing, mechanism carried by said cover for shifting the movable members of said variable power transmitting mechanism, and means on said shifting mechanism and co-operating with said casing to prevent the removal of said cover.

11. The combination of a variable power transmitting mechanism, a casing inclosing the same, a removable cover for said casing, a mechanism carried by said cover for shifting the movable members of said variable power transmitting mechanism, a control rod for operating the shifting mechanism, means for locking said cover to prevent the direct withdrawal thereof from the casing, and means to prevent rotation of said cover on said control rod.

12. The combination of a variable power transmitting mechanism, a casing inclosing the same, a removable cover for said casing, mechanism for shifting the movable members of said variable power transmitting mechanism, means for locking said shifting mechanism against operative movement, means for preventing the withdrawal of the cover directly away from the casing and independent means permanently fixed to said casing and projecting through said cover for preventing turning of the cover.

13. The combination of a variable power transmitting mechanism, a casing enclosing the same, a removable cover for said casing, a mechanism for shifting the movable members of said variable power transmitting mechanism, means for locking said shifting mechanism against operative movement, means on said shifting mechanism adapted to limit the vertical movement of said cover, and means permanently fixed to said casing adapted to co-operate with said cover for preventing the turning thereof.

14. The combination of a variable power transmitting mechanism, a casing enclosing the same, a removable cover for said casing, a plurality of shifter forks for shifting the movable parts of said variable power transmitting mechanism, means on one of said shifter forks for limiting the vertical movement of said cover, and means permanently fixed to said casing adapted to co-operate with said cover for preventing the turning thereof.

15. The combination of a variable power transmitting mechanism, a casing enclosing the same, a removable cover for said casing, a pair of shifter members for shifting the movable parts of said variable power transmitting mechanism, means for locking said shifter members against operative movement, and means intermediate the ends of said shifter members adapted to prevent the removal of said cover.

16. The combination with a casing, of transmission gear shifting forks therein, a cover on the casing, means mounted on the cover for shifting the forks in the casing, and means including a fixed slotted member and a member movable with said fork shifting means for preventing removal of the cover from the casing, when the forks are shifted to a predetermined position.

17. The combination with a casing, of transmission gear shifting forks therein, a cover on the casing, means mounted on the cover for shifting the forks in the casing, and means including a fixed slotted member and a laterally extending prong movable with said fork shifting means for preventing removal of the cover from the casing when the forks are shifted to a predetermined position.

18. Means for preventing the removal of a transmission casing cover comprising slotted fixed means, and longitudinally movable transversely extending means adapted to be moved vertically through the slot in said fixed means when said movable means are moved longitudinally to a predetermined position.

19. The combination with a casing, of transmission gear shifting forks therein, a cover on the casing, means mounted on the cover for shifting the forks in the casing, means including a fixed slotted member and a member movable with said gear shifting means for locking the cover on the casing when the forks are shifted out of a predetermined position, and means for locking the fork shifting means from movement into said predetermined position.

20. The combination with a variable speed power transmission mechanism, a case enclosing the same, a removable cover for the said case, and mechanism carried by the cover for shifting the movable members of said variable speed mechanism, of means contained within said cover for locking said shifting mechanism against operative movement, a flange on each side of the casing, and means carried by the shifting mechanism extending beneath said flanges.

In testimony whereof, I affix my signature.

WARREN T. HUNT.